US008635950B2

(12) United States Patent
Verhaeghe

(10) Patent No.: US 8,635,950 B2
(45) Date of Patent: Jan. 28, 2014

(54) BALER WITH A WEIGHING SYSTEM

(75) Inventor: Didier O. M. Verhaeghe, Ypres (BE)

(73) Assignee: CNH America LLC, New Holland, PA (US)

( * ) Notice: Subject to any disclaimer, the term of this patent is extended or adjusted under 35 U.S.C. 154(b) by 8 days.

(21) Appl. No.: 13/387,346

(22) PCT Filed: Jul. 19, 2010

(86) PCT No.: PCT/EP2010/060437
§ 371 (c)(1),
(2), (4) Date: Apr. 11, 2012

(87) PCT Pub. No.: WO2011/012488
PCT Pub. Date: Feb. 3, 2011

(65) Prior Publication Data
US 2012/0192730 A1    Aug. 2, 2012

(30) Foreign Application Priority Data

Jul. 29, 2009  (BE) .................................. 2009/0460

(51) Int. Cl.
*B30B 13/00*  (2006.01)
(52) U.S. Cl.
USPC ............................ 100/35; 100/45; 100/188 R

(58) Field of Classification Search
USPC ........ 100/7, 35, 43, 99, 179, 188 R, 215, 218;
177/136, 184, 185, 189; 53/502
See application file for complete search history.

(56) References Cited

U.S. PATENT DOCUMENTS

| 3,126,069 | A | * | 3/1964 | Shepley .......................... 177/136 |
| 4,742,880 | A | * | 5/1988 | Schrag et al. ................. 177/136 |
| 5,384,436 | A | * | 1/1995 | Pritchard ....................... 177/136 |
| 5,742,010 | A | * | 4/1998 | Griffin ........................... 177/161 |
| 5,760,344 | A | * | 6/1998 | Esken et al. ................... 177/136 |
| 6,134,870 | A | * | 10/2000 | Lippens et al. ................ 56/432 |
| 6,232,565 | B1 | * | 5/2001 | Gottlober ....................... 177/136 |
| 7,790,991 | B2 | * | 9/2010 | Verhaeghe et al. ............ 177/136 |
| 2008/0141870 | A1 | * | 6/2008 | Verhaeghe et al. ............... 100/7 |
| 2012/0240795 | A1 | * | 9/2012 | Tacke et al. ..................... 100/35 |
| 2012/0240797 | A1 | * | 9/2012 | Verhaeghe et al. ............. 100/43 |

FOREIGN PATENT DOCUMENTS

DE      102005035217 A1    3/2006
EP           974260 A1    1/2000

* cited by examiner

*Primary Examiner* — Dana Ross
*Assistant Examiner* — Leonel Vasquez
(74) *Attorney, Agent, or Firm* — Patrick M. Sheldrake

(57) ABSTRACT

A square baler weighing system weighs a bale during a weighing timespan when the rear portion pivots into the bale discharging position. The rear portion further having a brake for changing the speed of a bale moving along the rear portion. The brake is configured to exert an adjustable braking force.

15 Claims, 4 Drawing Sheets

BALER WITH A WEIGHING SYSTEM

This application is the US National Stage filing of International Application Serial No. PCT/EP2010/060437 filed on Jul. 19, 2010 which claims priority to Belgium Application BE2009/0460 filed Jul. 29, 2009, each of which is incorporated herein by reference in its entirety.

TECHNICAL FIELD

The present invention is related to agricultural square balers, used for picking up crop material such as hay or straw from the field and forming it into rectangular bales. The invention is in particular related to a baler provided with a weighing system equipped with a brake for slowing down the movement of bales before the bales are ejected from the baler.

BACKGROUND ART

Agricultural square balers gather crop material into a baling chamber where the material is compressed to parallelepiped packages by a reciprocating plunger. The finished packages are tied to form the bales, which proceed to be transported on a guide or slide at the exit of the baler, the so-called bale chute, from which they are lowered to the ground. The bale chute in prior art systems is usually provided with a tilting mechanism to avoid damaging the bales by lowering them gently to the ground. Examples of known balers of this type are described in EP-A-0974260 and EP-A-1935232. In some balers the bales are also weighed before they are discharged. In EP-A-1935232 for example, the bale chute has a rear portion that is pivotable around an axis situated below the bale support surface. The rear portion is further provided with a weighing table supported by load beams configured to produce a weight measurement signal. The baler of EP-A-1935232 may be further provided with a brake to slow down the bales when they are on the weighing table. Such a brake may be a friction brake arranged on a roller when the weighing table is formed of a roller conveyor, or a replaceable friction pad or edge included in the support surface. However, such brake systems are up to now provided as mechanical brakes which are activated manually by the operator. For this reason, the braking action is not always necessary nor can it be adapted to specific conditions in terms of the terrain and the crop. Especially in the case of the baler of EP-A-1935232, because of the specific structure and position of the pivot axis of the weighing table, the bales tend to move under influence of friction and gravity once the centre of gravity of the bale moves past this pivot axis. This movement of the bales is rather uncontrolled and is influenced by local conditions of the crop, the weather and the terrain. This uncontrolled movement leads to random errors when considering the weight measurement signal, which are difficult to compensate in a systematic way. Hence there is a need to have more control over the bale movement from the moment when it is positioned on the weighing table in order to improve the precision of the weighing system.

DISCLOSURE OF INVENTION

The present invention aims to improve a baler with a weighing means in order to improve the precision of the weighing means.

The present invention is related to a square baler and to a method as described in the appended claims.

According to a first aspect of the invention, there is provided a square baler having a baling chamber with a reciprocating plunger and a bale chute arranged at the discharge end of the baling chamber, the bale chute comprising:
 a front portion;
 a rear portion, that is pivotally mounted to the front portion about a horizontal axis for pivoting between an upper, bale sustaining, position and a lower, bale discharging position;
 the horizontal axis being located below the plane on which a bale slides and offset rearwards from a leading edge of the rear portion;
 the rear portion further comprising means for weighing a bale during a weighing timespan when the rear portion pivots into the bale discharging position; and
 the rear portion further comprising a brake for changing the speed of a bale moving along the rear portion,
 characterized in that the brake is configured to exert an adjustable braking force, and in that the baler further comprises:
 means for producing or receiving one or more parameters indicative of the weighing timespan;
 a control means configured to adjust the braking force on the basis of the one or more parameters.

In this way the way the accuracy of the weight measurement is improved with simple means that are retrofitable to known balers.

The brake is configured to produce a continuously or stepwise variable braking force.

The means for producing a parameter may comprise a microprocessor, configured to receive electronic signals produced by the weighing means, e.g. load beams, and further configured to calculate the parameter(s), e.g. $t_x$, on the basis of the electronic signals.

The means for producing a parameter may comprise one or more inclination sensors configured to measure the inclination of the pivotable frame and a processor configured to calculate the parameter on the basis of signals produced by the one or more inclination sensor(s).

According to a second aspect of the invention there is provided A method for weighing bales from a square baler according to the first aspect of the invention, characterised in that the method comprises the steps of:
 producing a bale in the square baler (10);
 moving the bale onto the bale chute (20);
 measuring the weight of the bale;
 producing or receiving one or more parameters indicative of the weighing timespan;
 adjusting the braking force of the brake (103) on the basis of the one or more parameters.

In this way the way the accuracy of the weight measurement is improved in a simple manner.

BRIEF DESCRIPTION OF DRAWINGS

The invention will now further be described, by way of example, with reference to the accompanying drawings in which.

MODE(S) FOR CARRYING OUT THE INVENTION

Figure 1:
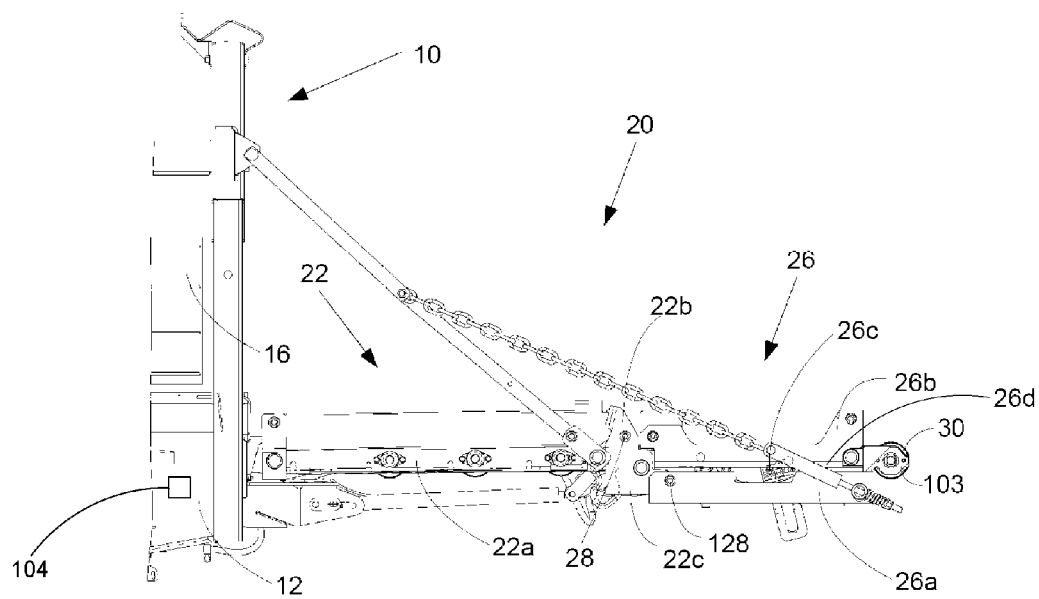
FIG. 1 shows a baler according to an embodiment of the invention.
Figure 2:
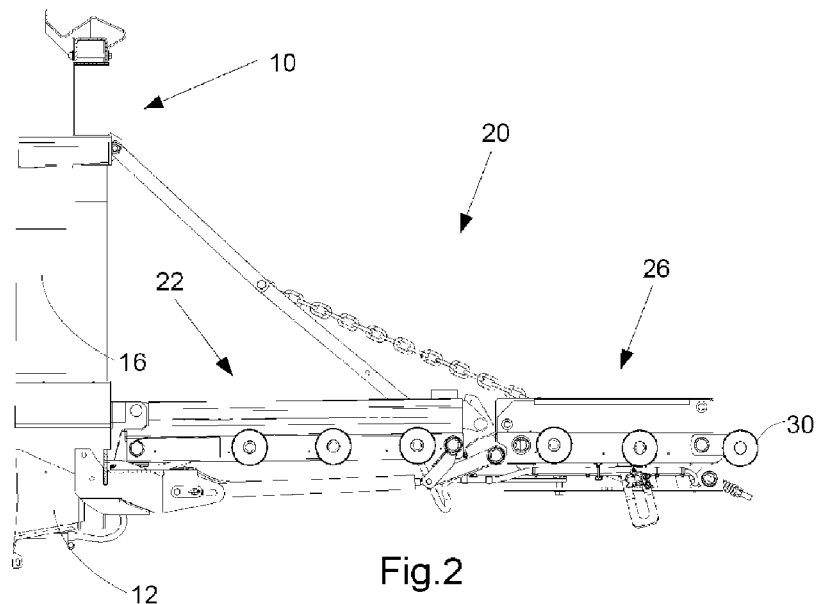
FIG. 2 shows a section of the baler according to FIG. 1.

FIGS. 1 and 2 show a baler 10 according to the invention. The main structural components correspond to the baler described in EP1935232, and comprise a baler frame 12 which is preferably configured to be hitched on to a towing tractor (not shown). Square bales are formed by a reciprocating plunger in a baling chamber 16, the bales are then tied and discharged from the rear end of the baling chamber onto the bale chute 20. The bale chute is formed of two portions: front portion 22 and rear portion 26. The front portion 22 comprises a first portion 22a that is pivotally attached to the baler frame 12 and a second portion that forms a frame made up of vertical plates 22b and a horizontal plate 22c. The second portion 22b, 22c is pivotally attached to the first portion 22a by means of an axis 28 that is only used to move the rear portion of the chute into the transport position as described more in detail in EP1935232. The rear portion 26 comprises a pivot frame 26a, which pivots about an axis 128 situated below the support surface of the front portion 22a and rearwards from the leading edge of the rear portion 26, and a weighing table 26b, which is supported on the pivot frame 26a by means of load beams 26c. The rear portion 26, that is pivotally mounted to the front portion 22 in this way pivots about a horizontal axis 128, perpendicular to the travelling direction, between an upper, bale sustaining, position and a lowered, bale discharging position to allow each bale to be lowered onto the ground without the bale toppling onto its end as it leaves the bale chute 20. The position of the pivot axis 128 provides a clear separation of the bale once the weighing table 26b pivots in the bale discharging position, so that the bale may be weighed during this suitable weighing timespan. The weighing table is formed of a roller conveyor as more clearly visible in FIG. 2. According to this embodiment of the invention, one of the rollers, preferably the last roll 30 is provided with a braking device mounted on the roller's axis, and configured to influence the roller's rotational speed by the braking force. The brake 103 may be a magnetic brake of a known type, such as a flange mounted brake from Warner Electric. Other known configurations are possible such as for example a hydraulic disc or drum brake. Generally, the brakes that are usable in the invention have a brake force which is adjustable on the basis of a control signal. This means that the brake may be activated, or deactivated and its resulting braking force can be changed when the relevant control signal is transmitted to the brake. Preferably, a change in the brake force is controllable in a continuous or step-wise fashion. The baler comprises a control means for producing such a control signal. This may be any type of electronic controller unit known in the art.

Figure 3:
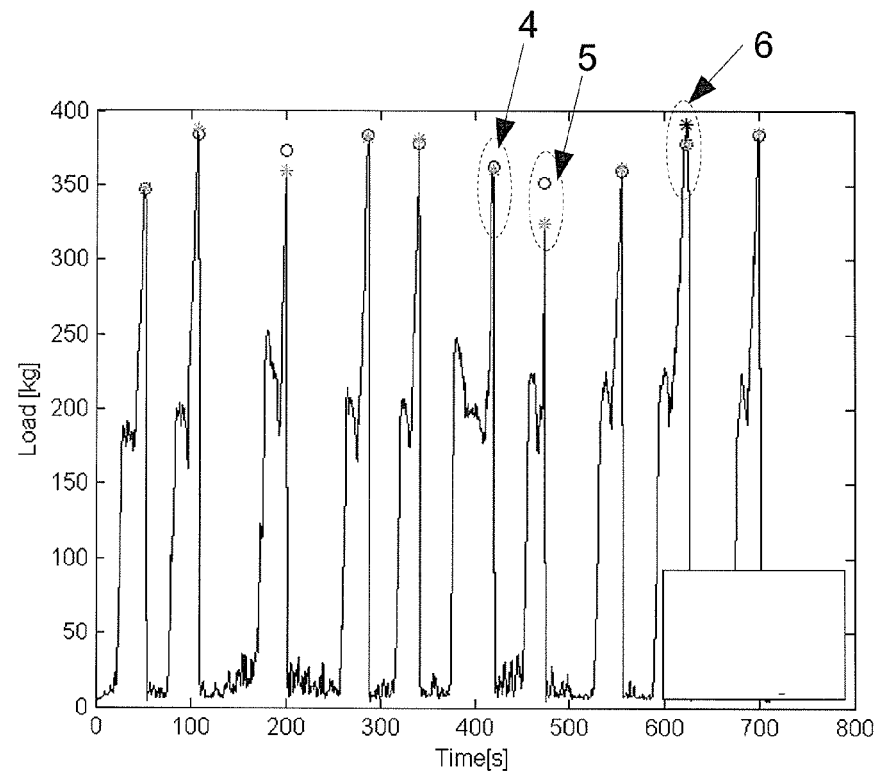
FIG. 3 shows a weight measurement signal as a function of time, of bales produced by a baler as shown in FIG. 1.
Figure 4:
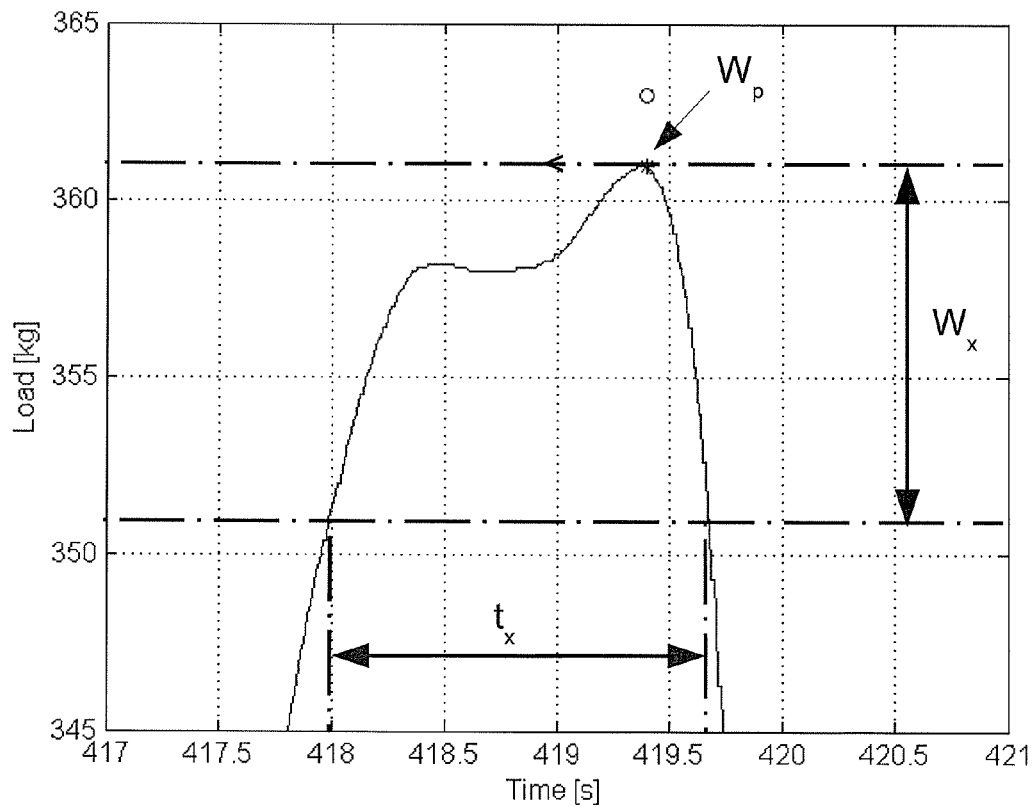
FIGS. 4, 5 and 6 show details of the weight measurement signal of FIG. 2.
Figure 5:
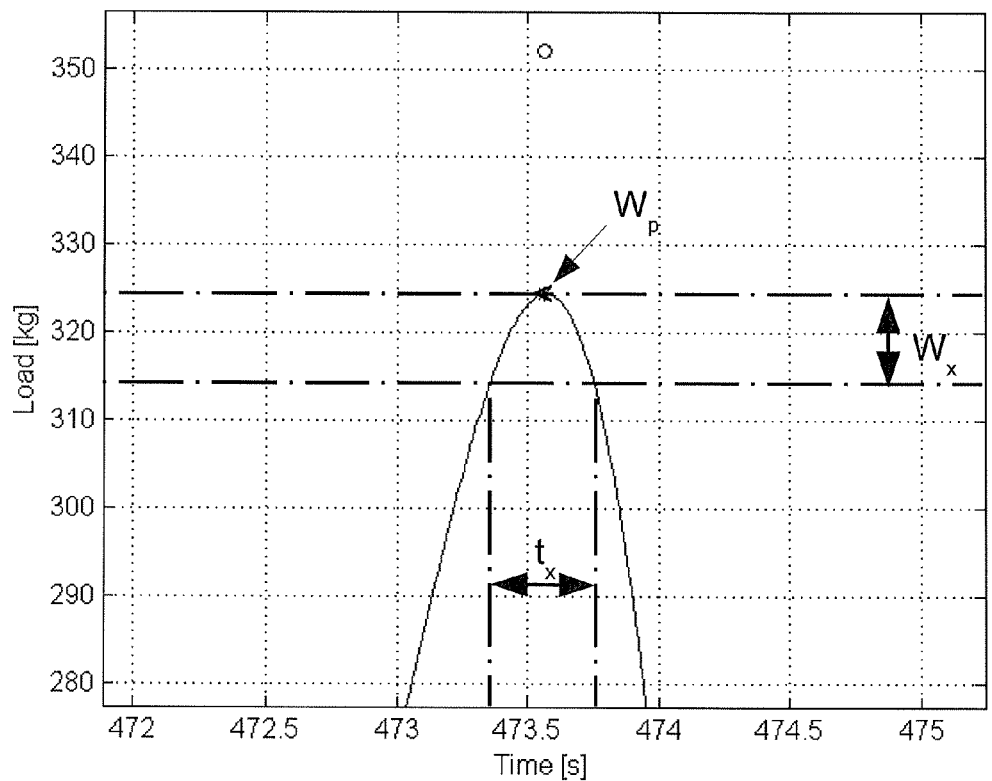
Figure 6:
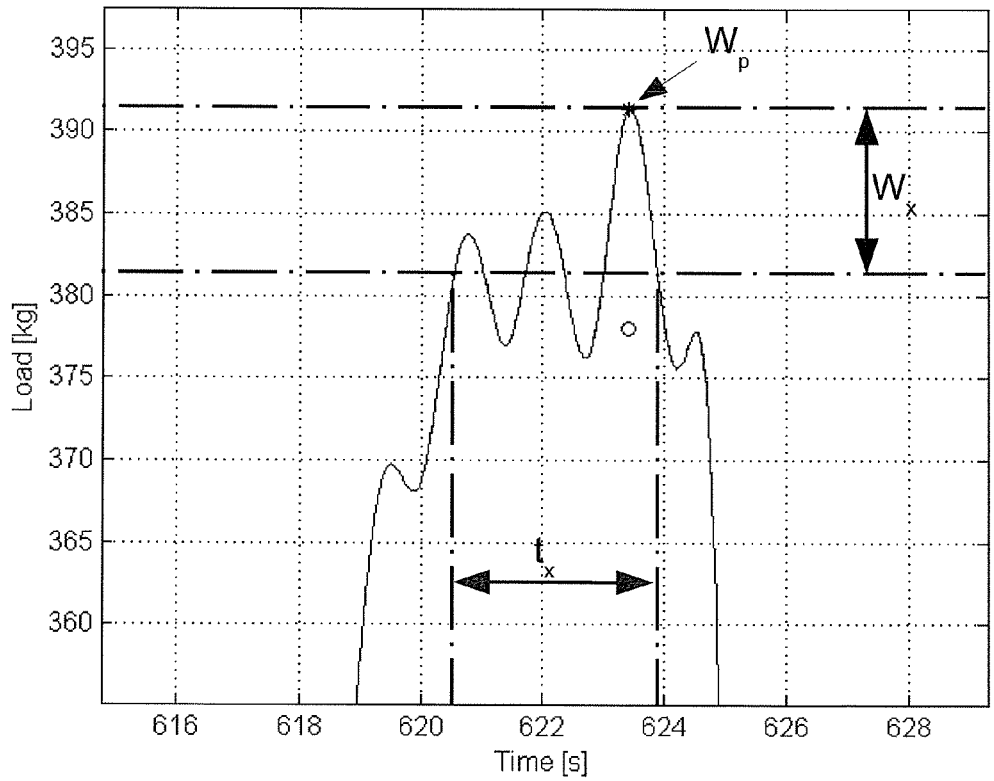

FIG. 3 shows a record of weighing data as a function of time, when using a baler according to the invention and performing the method according to the invention. The circles show the actual weight of the bales, while the stars indicate the weight derived from the load beam signals. It can be seen that the two values do not always correspond. In FIGS. 4, 5 and 6, a closer look is taken at the measurements indicated by the same numbers in FIG. 3. In all three cases, $W_p$ represents the peak of the measured signal, corresponding to the measured weight value (in kg). The time interval $t_x$ is determined, between the point where the measured weight reaches $W_p$-$W_x$ immediately before $W_p$ is reached and the point where the same weight $W_p$-$W_x$ is reached, immediately after the peak weight $W_p$ has been reached. $W_x$ is a suitable threshold weight and is set to 10 kg in the examples shown in FIGS. 4, 5 and 6, but could be chosen to be a different weight or as a certain percentage of $W_p$. The interval $t_x$ is an indication of the timespan during which the bale is in optimal weighing condition. FIG. 4 shows the most desirable situation, in which $t_x$ equals approximately 1.5 s, which corresponds approximately to the period of the plunger movement of the baler (42 cycles/minute). The measured weight corresponds well to the actual weight of the bale. In the case of FIG. 5, the bale has moved at a higher speed along the weighing table, leading to a $t_x$ interval of around 0.5 s. This may be due to the fact that the baler moves along a slope, for example. Clearly, the weight signal has not been processed fast enough to be able to approximate the actual weight, and a non-negligable error is made. In FIG. 6, a measurement is shown where a bale spends too much time on the weighing table. The oscillation of the weight signal may be due to bumps in the terrain, causing the bale to jump up and down on the weighing table or due to the influence of the next bale coming out of the baling chamber 16. The result is that the peak weight is an overestimation of the actual weight.

Figure 7:
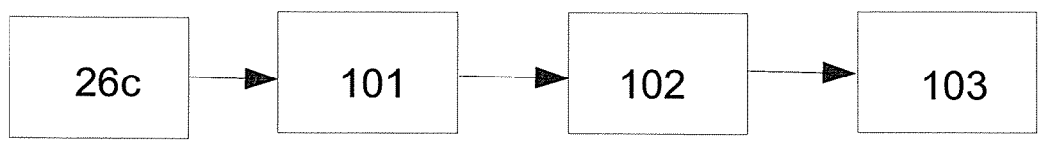
FIG. 7 shows a schematic view of the components of the control cycle applied in a baler and weighing method according to the invention.

According to the preferred embodiment, the plunger period is taken as the desired value for $t_x$, which is thus used as a control parameter to control the brake. When a weight measurement is done, $t_x$ is determined, and the braking power is adjusted on the basis of this parameter. For example, if $t_x$ is lower than 1.5 s, the braking power is increased, and if $t_x$ is higher than 1.5 s, the braking power is decreased. This is shown schematically in the control cycle depicted in FIG. 7, and comprising the load beams 26c, a processing unit 101 where the measured weight signals are processed to produce the $t_x$ value, and a control unit 102 to control the brake 103 on the basis of $t_x$.

This cycle defines the method according to this embodiment of the invention, the method comprising the steps of:
  Producing a bale in the baling chamber of the square baler;
  Moving the bale onto the bale chute;
  Measuring the weight of the bale as a function of time;
  deriving from this measurement the parameter $t_x$ which is indicative of the weighing timespan;
  Adjusting on the basis of $t_x$ the braking force exerted by the brake on the next bale produced in the baling chamber.

The exact control algorithm is not described here and is within the knowledge of the skilled person. When considering this method as applied in FIG. 3 starting at the weight measurement identified with reference number 4 $t_x$ will be approximately 1.5 s as explained above with reference to the description of FIG. 4. As this represents the situation in which the weighing timespan is equal to the desired weighing timespan the controller will apply as the braking force for the next bale a braking force that is equal to the current braking force. During the next weight measurement identified with reference number 5 $t_x$ is approximately 0.5 s as explained above with reference to the description of FIG. 5. As this represents the situation in which the weighing timespan is lower than the desired weighing timespan the controller will decrease the braking force for the next bale as compared to the current braking force. During the next weight measurement this decreased braking force will result in a $t_x$ of about 1.5 s and the braking force will remain as it is for the next bale. In the next weight measurement identified with reference number 6 $t_x$ is higher then 1.5 s as explained above with reference to the description of FIG. 6. As this represents the situation in which the weighing timespan is higher than the desired weighing timespan the controller will increase the braking force for the next bale as compared to the current braking force. During the next weight measurement this increased braking force will result in a $t_x$ of about 1.5 s and the braking force will remain as it is for the next bale. For determining the parameter $t_x$, the value of $W_x$ of 10 kg may be replaced by other values. If this value is too small however, errors of the type shown in FIG. 6 may remain undetected.

The control of the brake may be based on other parameters than $t_x$. On the baler shown in FIG. 1 and according to EP-A-1935232, inclination sensors 26d may be present to measure the inclination of the weighing table 26b. As described in EP-A-1935232, these inclination sensors 26d may be used to determine the time interval $t_i$ during which the weighing table is within a predefined inclination range, being the optimum weighing range, for example 14 degrees around the horizontal. The time interval $t_i$ may then be used in the same way as $t_x$ described above, as the basis for controlling the braking force.

Normally, the brake can be deactivated completely after each weight measurement and re-activated before the next measurement. This can be useful because the braking power may have a negative effect on the bale discharge outside the actual measurement period. For example, a given number of seconds after the $t_x$ interval or after the $t_i$ interval, the brake is deactivated, and re-activated when a first inclination of the weighing table is detected by the inclination sensor, or when the weight measurement signal passes a certain minimum weight indicating that a bale is present on the weighing table.

In the methods described above, each determination of $t_x$ or $t_i$ is used as a basis for adjusting the brake during the next weight measurement. Alternatively, when the processor operates sufficiently fast, the brake may be controlled within each measurement cycle, to influence the speed of the bale as it is weighed. This may for example be done by measuring the slope of each rising weight measurement peak, and adjusting the braking power on the basis of this slope.

According to one embodiment, the braking force is controlled on the basis of the inclination of the terrain on which the baler is moving. It is known in the art to apply detecting means 104 on balers to detect this inclination. The signal indicative of this inclination may be used as an input for controlling the braking force, so that when the baler moves (i.e. is towed) downhill, a lower braking force is applied and when the baler moves uphill, a higher braking force is applied.

According to still another embodiment, a means may be present to input a parameter indicative of the type of crop that is being gathered by the baler. The operator may for example enter such a parameter before the baling starts. The control means is then programmed to apply a braking force in accordance with the type of crop: for example crop that has a higher density may receive a higher braking force.

All the parameters described above may be used separately or in combination on a baler and in a method according to the present invention.

The invention is applicable to any type of brake system, not only to a brake mounted on a roll of a rolling conveyor. For example, the same control method can be applied on a movable friction plate or pad, configured to apply friction on one or more surfaces of a bale, to thereby influence the speed of the bale along the bale chute.

The invention as defined by the claims is not limited to the exemplary embodiments as described and shown in the Figures, but can equally comprise combinations and variants that fall within the scope of the claims.

The invention claimed is:

1. A square baler having a baling chamber with a reciprocating plunger comprising
   a bale chute, arranged at the discharge end of the baling chamber comprising a front portion and a rear portion pivotally mounted to the front portion about a horizontal axis for pivoting between an upper, bale sustaining, position and a lower, bale discharging position;
   the horizontal axis being located below the plane on which a bale slides and offset rearwards from a leading edge of the rear portion;
   the rear portion configured for weighing a bale during a weighing timespan when the rear portion pivots into the bale discharging position;
   the rear portion further comprising a brake for changing the speed of a bale moving along the rear portion;
   the brake configured to exert an adjustable braking force, a sensor for producing or receiving one or more parameters indicative of the weighing timespan;
   a controller configured to receive one or more parameters indicative of the weighing time span and adjust the braking force on the basis of the one or more parameters.

2. A baler according to claim 1, wherein the rear portion comprises a roller conveyer and in that the brake is mounted on the axis of at least one of the rollers of the roller conveyor configured to influence the rotational speed of the at least one roller.

3. A baler according to claim 1, wherein the brake is configured to apply friction on one or more surfaces of a bale.

4. A baler according to claim 1, wherein the rear portion for weighing a bale comprises:
   a pivot frame which pivots about the horizontal axis; and
   a separate weighing table supported on the pivot frame by mountings which comprise load beams.

5. A baler according to claim 4, further comprising the sensor for measuring the inclination of the pivot frame relative to remainder of the bale chute and the one more parameters indicative of the weighing timespan is generated therefrom.

6. A baler according to claim 1, wherein the rear portion comprises the sensor which is configured for weighing a bale and the one more parameters indicative of the weighing timespan is generated therefrom.

7. A baler according to claim 1, further comprising a sensor for measuring an inclination of the baler with respect to the horizontal and wherein a parameter indicative of the weighing timespan is generated at least from the inclination.

8. A baler according to claim 1, further comprising an input for receiving a parameter indicative of the type of crop that is being gathered by the baler and wherein a parameter indicative of the weighing timespan is generated at least from the parameter indicative of the type of crop.

9. A method for weighing bales from a square baler comprising the steps of:
   producing a bale in the square baler;
   moving the bale onto a bale chute;
   measuring a weight of the bale;
   producing or receiving at least one parameter indicative of a weighing timespan;
   adjusting a braking force of a brake configured to effect movement of the bale on the basis of the at least one parameter.

10. A method according to claim 9, wherein the at least one parameter indicative of the weighing timespan is produced by:
   determining from the weight measurement of the bale a peak weight measurement;
   determining from the weight measurement of the bale a time interval between the moment when the measured weight equalled a threshold weight immediately before the peak weight measurement and the moment when the measured weight equals the threshold weight again immediately after the peak weight measurement.

11. A method according to claim 9, wherein the at least one parameter indicative of the weighing timespan is produced by determining from the weight measurement of the bale a slope of a measured weight curve as it rises towards a peak weight measurement.

12. A method according to claim 9 wherein, the at least one parameter indicative of the weighing timespan is produced by determining from a measurement of the inclination of the weighing table a time interval during which the inclination of the weighing table is in a predefined range.

13. A method according to claim 9, wherein the braking force is increased when the weighing timespan is lower than a period of the reciprocating plunger and the braking force is decreased when the weighing timespan is higher than the period of the reciprocating plunger.

14. A method according to claim 9, wherein the brake is deactivated during a time-interval starting after a bale has been weighed and ending before a next bale is weighed.

15. A method according to claim 9, wherein the at least one parameter indicative of the weighing timespan is determined by a parameter indicative at least one of the inclination of the terrain on which the baler is moving and the type of crop that is being gathered by the baler.

* * * * *